June 20, 1961     D. V. SARBACH     2,988,760
UPHOLSTERED CUSHION AND METHOD OF MAKING THE SAME
Filed June 16, 1958
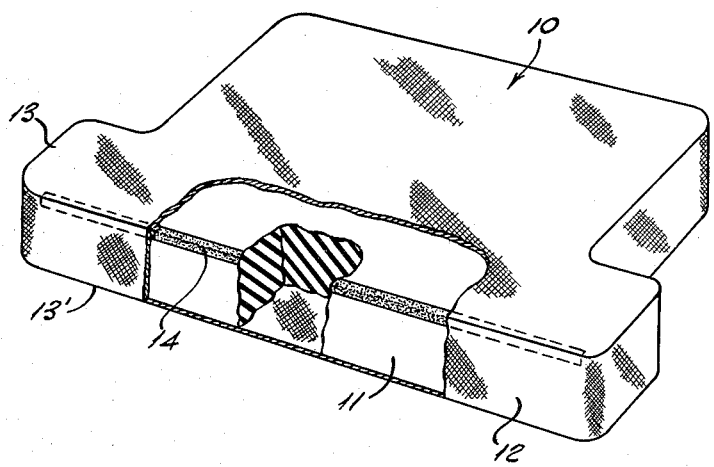
INVENTOR
DONALD V. SARBACH
BY
Burgess, Ryan, & Hicks
ATTORNEYS

United States Patent Office 2,988,760
Patented June 20, 1961

2,988,760
UPHOLSTERED CUSHION AND METHOD OF MAKING THE SAME
Donald V. Sarbach, Westport, Conn., assignor, by mesne assignments, to Stauffer-Hewitt, Inc., Franklin, N.J., a corporation of Delaware
Filed June 16, 1958, Ser. No. 742,092
2 Claims. (Cl. 5—345)

The present invention relates to an upholstered cushion and method of making the same. It relates, more particularly, to an upholstered foam rubber cushion and a method of attaching the upholstery thereto.

Cushions made of foam rubber covered by envelopes of upholstery fabric which fit the cushions are commonly used in all types of furniture today. One of the difficulties with upholstered cushions of this type is that during use the upholstery fabric will creep or shift relative to the cushion and welted edges of the upholstery will not remain aligned with the corners of the cushion. As a result, the upholstered cushion will have an unsightly or sloppy appearance.

The present invention is directed to providing an upholstered foam rubber cushion which overcomes this difficulty in a simple and economical manner. An object of the present invention is to provide an upholstered foam rubber cushion in which the upholstery fabric is attached to the cushion so that it cannot creep or shift relative thereto, but can be readily removed if desired.

Another object of the present invention is to provide a method of attaching upholstery fabric to a foam rubber cushion which does not require sewing or special fastening devices such as tapes, clips or the like.

Various other objects and advantages of the invention will be apparent and best understood from the following description and the accompanying drawing which is a perspective view in partial section of an upholstered foam rubber cushion embodying the present invention.

As shown in the drawing, there is an upholstered cushion 10 which comprises a core 11 of a material such as foam rubber enclosed in a cover 12 of an upholstery fabric.

The core 11 is formed in the desired shape or conformation from latex foam or similar material in the usual manner. The cover 12 is made so that it fits the core exactly and is provided with the usual opening (not shown) which permits the rubber core to be inserted in or removed from the cover as desired. Generally, the cover will have sewn seams or welts 13, 13' extending along the corners or edges thereof which should be aligned with corresponding corners or edges of the cushion for purposes of appearance and the like.

In order to maintain the seams or welts of the cover in alignment with the corresponding corners or edges of the cushion, a coating 14 of an adhesive or cement of a type which will dry tack free, but which may be reactivated to an adhesive condition by application of a suitable solvent thereto, is applied to one or more of the edges of the foam rubber core after it has been formed in the desired shape. The adhesive is then permitted to dry to its tack free state before the core is inserted in the cover so that the adhesive will not interfere with the proper positioning of the core within the cover.

When the core has been placed in position inside of the cover, a solvent for activating the adhesive is applied through the fabric of the cover to the edges of the core which have been previously coated with the adhesive. Such activation of the adhesive causes the adhesive coating on the core to become tacky while it is in contact with the fabric of the cover. When the adhesive dries after such activation, it will bond the fabric of the cover to the coated edges of the core and thus, effectively prevent creeping or shifting of the cover relative to the core.

To remove the cover from the core, it is only necessary to apply solvent through the fabric to the coated edges of the core and to slip the core out of the cover before the adhesive dries.

The adhesive may be applied to the core at the time of manufacture or at any time prior to the cushions being upholstered. The adhesive coating may be applied to the core by means of a roller, brush or the like. Generally, an adhesive coating of from ½ to 1 inch in width along the edge of the core will be effective and ordinarily the adhesive coating need only be applied along the top or bottom edge at the front of the core. However, the adhesive coating may be applied along additional edges of the core if desired.

The solvent may be applied to the outside of the cover by means of a brush or other suitable applicator in the case of a porous fabric such as a woven fabric. If the fabric is non-porous (such as a film), the solvent may be applied by piercing the fabric with a hollow needle, such as a hypodermic needle, at spaced points and injecting a few drops of the solvent at such points between the fabric and the core.

A number of solvent activatable adhesives are commercially available and may be used as the adhesive coating in accordance with the present invention. In general, rubber based adhesives which will adhere readily to latex or other plastic foams and which can be tackified after drying by moistening with a volatile organic rubber solvent without staining the upholstery fabric may be used. Examples of solvents for such adhesives are 1,1,1-trichloroethane (Chlorothene), carbon tetrachloride, aliphatic hydrocarbons, dry cleaner's naphtha, gasoline, etc.

An example of a suitable solvent activatable adhesive which may be employed for the adhesive coating is set forth in United States Patent No. 1,937,861, issued December 5, 1933, to William F. Zimmerli for Adhesive Composition and Method of Making Same.

It will be understood that various changes and modifications may be made in the method and in the embodiment of the present invention described herein without departing from the scope of the invention as defined by the claims appended hereto.

What is claimed is:

1. An upholstered cushion comprising a core of foam material, a complete cover of solvent permeable fabric enclosing said core, a coat of a solvent activatable adhesive extending along and directly in contact with the surface of said core adjacent one edge thereof and parallel to the latter edge, said adhesive directly contacting said core and intimately uniting said cover to said core along said one edge by direct adhesion by said cover to said core, said cover being fixed in position with respect to said core by direct adhesion of said cover to said core along said one edge, said cover being readily removable as a unit from said core upon solvent activation of said adhesive, said cover being adapted to be penetrated from its exterior for application of said solvent to said adhesive from the exterior of said cover.

2. The method of attaching a cover of upholstery fabric to a core of foam material such as foam rubber, which comprises applying a solvent activatable adhesive to a surface extending along one edge of a core of foam material and permitting said adhesive to dry, placing said core with the dry adhesive coating thereon inside of a cover of upholstery fabric, then forming a bond between the cover and the core at said edge by applying a solvent to the adhesive coating on the core through the fabric of the cover and permitting the adhesive coating to dry while in contact with the fabric of the cover and the core.

References Cited in the file of this patent

UNITED STATES PATENTS

| | | |
|---|---|---|
| 2,094,613 | McBurney et al. | Oct. 5, 1937 |
| 2,326,441 | Cunningham | Aug. 10, 1943 |
| 2,770,816 | Reisner | Nov. 20, 1956 |